June 27, 1967   F. S. JERMAIN, JR   3,328,070
FOLDING SEAT ASSEMBLY
Filed June 21, 1965   2 Sheets-Sheet 1
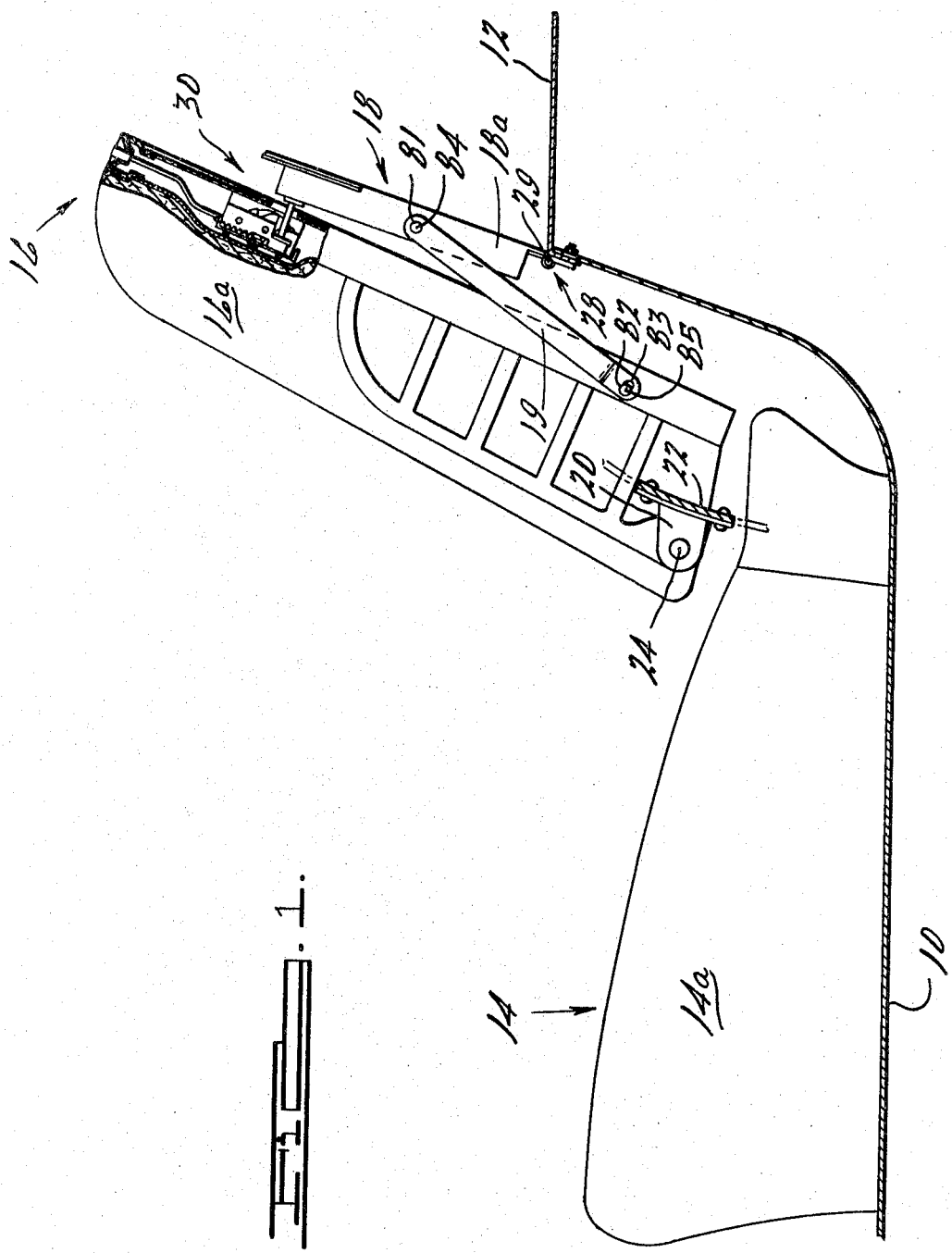
INVENTOR.
*Frederick S. Jermain, Jr.*
BY
*Harness and Harris*
ATTORNEYS

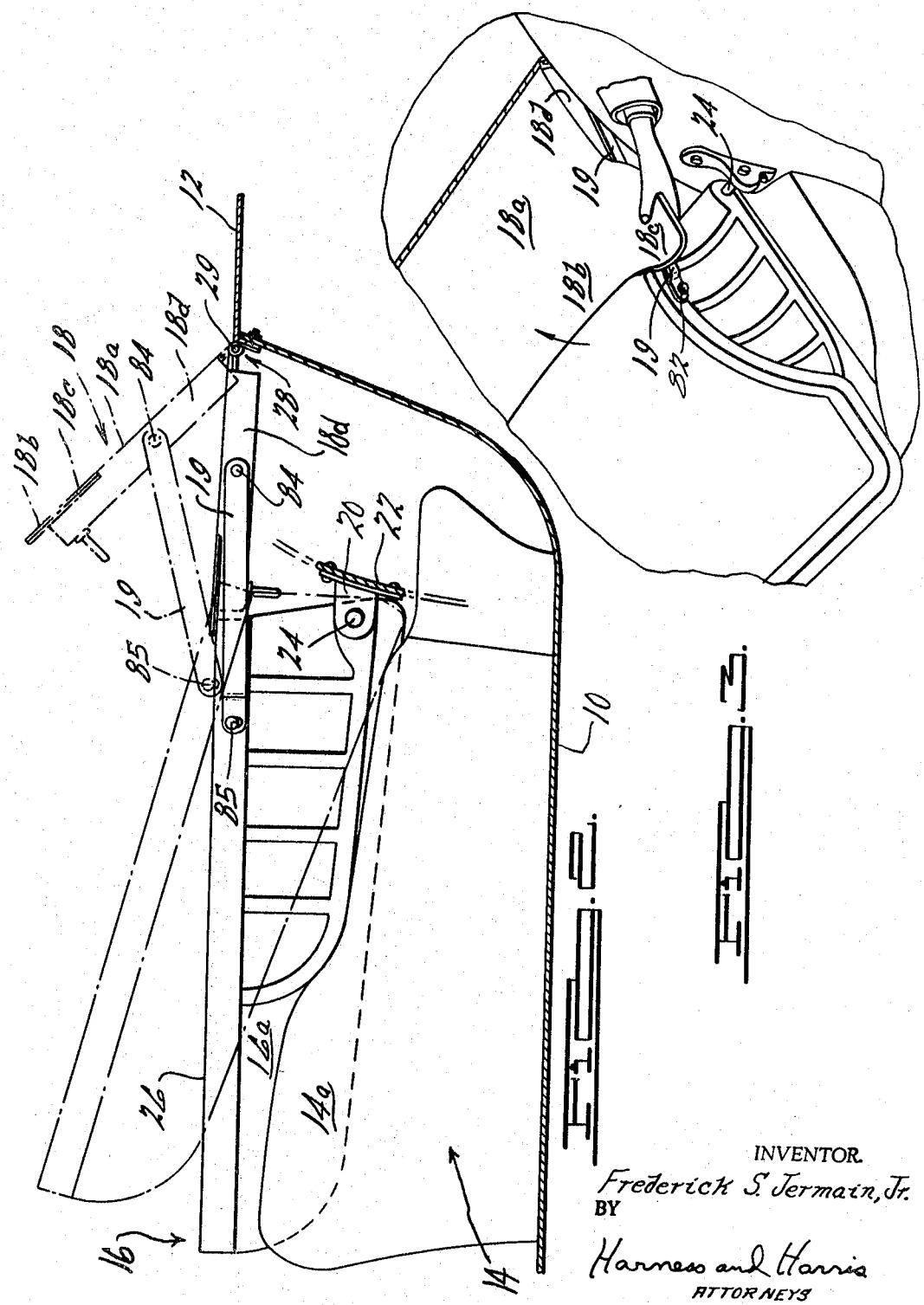

United States Patent Office 3,328,070
Patented June 27, 1967

3,328,070
FOLDING SEAT ASSEMBLY
Frederick S. Jermain, Jr., Roseville, Mich., assignor to Chrysler Corporation, Highland Park, Mich., a corporation of Delaware
Filed June 21, 1965, Ser. No. 465,373
4 Claims. (Cl. 296—66)

This invention relates to vehicle seats and more particularly to a folding seat assembly for use with a multipurpose vehicle body.

The seat assembly of the invention is intended primarily for use in multi-purpose vehicle bodies such, for, example, as station wagon bodies. The seating arrangement for bodies of this type generally includes a driver's seat and a foldable second seat located rearwardly of the driver's seat and movable between a normal passenger-carrying position and a folded load-carrying position. The portion of the vehicle body floor rearwardly of the second seat is normally elevated above the level of the floor portion supporting the seats to provide clearance for the rear wheel and axle structure of the vehicle. With the second seat in folded position, the back of this seat is disposed above the seat bottom, with the back surface of the seat back located substantially flush with the elevated rear floor portion.

A typical folding second seat assembly also generally includes a "flipper" or floor panel swingably mounted behind the seat back adjacent the forward edge of the elevated rear floor portion. The floor panel is usually arranged to assume a generally upstanding position behind the seat back when the latter is in its upright or seating position and to pivotally move into and fill the space between the rear edge of the seat back and the forward edge of the elevated rear floor portion as the seat back is moved into its horizontal or cargo-carrying position. In this position, the back surface of the seat back, the floor panel, and the elevated cargo floor portion line up in serial flush relation to form a flat, continuous cargo floor.

Folding seat assemblies as described above, while generally satisfactory, have exhibited some undesirable behavior characteristics.

Specifically, they require a rather high operator effort to move the seat back and floor panel to their flolded positions. Further, it is sometimes difficult to tell when the seat back and flipper panel have assumed their folded positions so that several distinct operator efforts may be required before firm positioning is achieved.

Further, the above described seat assemblies have been susceptible to accidental release of the flipper panel and seat back from their folded positions occurring, for example, upon movement of the vehicle over rough surfaces.

Such seat assemblies also require a rather high operator effort to release the seat back and floor panel for movement to their seating positions.

Accordingly, it is an object of the present invention to provide an improved folding seat assembly for a multi-purpose vehicle body.

It is a specific object to provide such a seat assembly which will be relatively easy to firmly seat in the folded or cargo-carrying position.

A further object is to provide such a seat assembly which will be extremely resistant to accidental release of the seat back from its folded position.

Yet another object is to provide a seat assembly which will be relatively easy to purposely release from the cargo-carrying of folded position.

The folding seat assembly of the invention utilizes a link pivotally interconnecting the seat back and floor panel so that movement of the seat back between its cargo-carrying and seating positions automatically, and in known manner, moves the floor panel between its corresponding positions. According to an improved feature of the invention, the locations of the link pivot axes on the seat back and floor panel are such that as the seat back and panel are moved downwardly and approach their cargo-carrying position, the pivot axis of the link to the panel passes over center with respect to the pivot axis of the link to the seat back and the pivot axis of the panel to the elevated rear floor portion. This arrangement provides several advantages.

First, the panel and seat back are moved crisply and positively to their folded positions as the link-to-panel axis snaps over center as above described.

Further, the resiliency of the mutually compressed seat bottom and seat back cushions generates a continual force urging the seat back in a direction tending to accentuate the over center relationship of the link-to-panel axis. The described arrangement is thus extremely resistant to accidental displacement of the seat back out of its folded position.

The described arrangement also facilitates movement of the seat back out of its folded position since a mederate operator effort exerted for example on a handle portion provided as a lateral extension of the floor panel, moves the link-to-panel axis back over center so that the flipper panel and seat back pop crisply out of their folded positions and move, under the urging of the compressed cushions, a substantial distance upwardly toward their upright seating positions.

These and other objects, features, and advantages of the invention will be apparent from the following detailed description of a preferred embodiment of the invention and from the accompanying drawings wherein:

FIG. 1 is a side view of a folding seat assembly according to the invention shown in upright or seating position;

FIG. 2 is a view similar to FIG. 1 showing the seat in folded or cargo-carrying position; and FIG. 3 is a fragmentary perspective view of the folding seat assembly of the invention showing the manner in which operator effort is applied to the floor panel to move the seat back and panel out of their cargo-carrying positions.

Referring first to FIGS. 1 and 2, the folding seat assembly of the invention is therein shown installed in a multi-purpose vehicle body of the type including a vehicle floor having a relatively depressed portion 10 supporting the seat assembly and a cargo-carrying portion 12 elevated above the level of portion 10 to provide clearance for the wheel and axle structure (not shown) of the vehicle.

The folding seat assembly, broadly considered, comprises a seat bottom 14, a seat back 16, a floor panel 18, and a link 19 pivotally interconnecting seat back 16 and floor panel 18.

Seat bottom 14 is stationary. Seat back 16 is mounted by brackets 20 projecting from wheel housings 22 for pivotal movement about an axis 24 between a generally upright seating position and a generally horizontal cargo-carrying position.

In its upright seating position, as seen in FIG. 1, seat back 16 extends upwardly above the level of elevated floor portion 12 and is spaced somewhat forwardly of the forward edge of that floor portion.

In its cargo-carrying position, as seen in solid lines in FIG. 2, the seat back extends forwardly to overlie the seat bottom. In this position, its back surface 26 is substantially flush with the surface of elevated floor portion 12 but the rear edge of the seat back is spaced forwardly from the forward edge of floor portion 12.

Floor panel 18 is mounted at its rearward edge (as viewed in FIG. 2) by a pivot hinge assembly 28 for pivotal movement about an axis 29 lying along the forward edge of elevated floor portion 12. Floor 18 includes a generally rectangular, relatively thick main body portion 18a, a relatively thin transverse flange portion 18b extending forwardly from the forward edge of main body portion 18a, and a relatively thin flange portion 18c extending laterally from a side edge surface 18d of main body portion 18a.

Hinge assembly 28 mounts panel 18 for movement between a generally upright seating position and a generally horizontal cargo-carrying position.

In its upright position, as seen in FIG. 1, panel 18 extends upwardly above floor portion 12 immediately behind the upright seat back 16. Latch means, shown generally at 30, are provided to releasably secure panel 18 to seat back 16 with the seat back and panel in their upright positions. A copending application, Ser. No. 462,269, filed June 8, 1965 and assigned to the assignee of the present application, discloses details of the construction and operation of one form of latch means that has been found effective to latch panel 18 to seat back 16.

In its cargo-carrying position, as seen in solid lines in FIG. 2, panel 18 spans the space between the forward edge of elevated floor portion 12 and the rearward edge of seat back 16 with the panel flange portion 18b overlapping the rearward edge of the seat back.

Link 19 is pivotally connected at its one end by a pin 81 to side edge surface 18d of the main body portion 18a of panel 18. The other end of link 19 is pivotally connected to the corresponding side edge surface of seat back 16 by a pin 82 received in a slot 83 in link 19. Thus, movement of the seat back between its cargo carrying and upright seating position automatically and positively moves the floor panel between its corresponding positions.

The locations of the link-to-panel axis 84 and the link-to-seat back axis 85 are chosen relative to the seat-to-body axis 24 and the panel-to-floor axis 29 so that as the seat back and panel approach their upright or seating position, axis 85 passes over center with respect to axes 24 and 84.

Movement of axis 85 over center with respect to axes 24 and 84 as the seat back and panel approach their upright seating positions results, as more fully described in the above-identified copending application, in a reversal of the direction of pivotal movement of panel 18 so that as the seat back and panel reach their upright positions they are moving toward each other to ensure crisp engagement of latch means 30. As is also more fully described in the above-identified copending application, the over center relationship of axis 85 relative to axes 24 and 84 also contributes importantly to the ability of the seat back to withstand the impact of sliding cargo without collapsing.

The locations of the various pivot axes as well as the dimensions of the various components are also chosen so that as the seat back and floor panel move downwardly and axis 84 approaches the plane of axes 29 and 85, link 19 and the portion of panel 18 between axes 84 and 29 are placed in compression; thus, as soon as axis 84 is moved infinitesimally beyond the plane of axes 29 and 85 by the momentum of the downwardly moving seat back and panel, the compressed members expand to snap axis 84 positively over center with respect to axes 29 and 85. As axis 84 snaps over center, panel 18 is moved crisply downwardly with the extent of this over center movement being limited by the movement of flange portion 18a into abutting overlapping relation to the rearward edge of seat back 16.

As seat back 16 is moved downwardly to its cargo-carrying position, seat back cushion 16a is compressed against seat bottom cushion 14a. Thus, with the seat assembly in folded position, the mutually compressed cushions exert a continual force urging seat back 16 upwardly. Since the line of action of link 19 passes below panel axis 29, the cushion force urging seat back 16 upwardly is transmitted through link 19 to continuously urge panel 18 downwardly and thereby maintain flange 18a firmly pressed against the seat back. The second seat assembly of the invention is thus extremely resistant to being jostled or shaken out of its folded or cargo-carrying position.

When it is desired to release the seat assembly for movement to its seating position, it is only necessary to move axis 84 back over center with respect to axes 29 and 85. This is accomplished, as best seen in FIG. 3, by grasping the handle provided by flange portion 18c and exerting a moderate upward force. This snaps axis 84 back over center, whereafter the force generated by the resiliency of the compressed cushions 14a and 16a combines with force generated by the expansion of compressed link 19 and panel 18 to simultaneously move the seat back and panel a substantial distance toward their respective upright or seating positions. The approximate positions to which the seat back and panel are thus automatically raised are shown in dash lines in FIG. 2. The seat back and floor panel may be thereafter raised to their upright seating positions of FIG. 1 by a moderate effort exerted on the seat back.

While a preferred embodiment of the invention has been illustrated and described in detail, it is to be understood that various changes may be made in the disclosed embodiment without departing from the scope or spirit of the invention as defined by the appended claims.

I claim:

1. In a motor vehicle body of the type including a floor having an elevated cargo-carrying portion:
    (A) a vehicle seat comprising
        (1) a seat bottom and
        (2) a seat back having a flat back surface;
    (B) means pivotally mounting said seat back on said body for pivotal movement between
        (1) a generally upright seating position wherein said seat back extends upwardly above said elevated floor portion adjacent thereto and
        (2) a generally horizontal cargo-carrying position wherein said seat back overlies said seat bottom and said flat back surface is substantially flush with said elevated floor portion but spaced horizontally therefrom;
    (C) a generally rectangular floor panel having a flat back surface and a flange portion extending forwardly from its forward edge to form an extension of said back surface, said panel being pivoted adjacent one end to said body on an axis adjacent said elevated floor portion for movement between
        (1) a generally upright seating position wherein it extends upwardly above said floor portion adjacent said seat back and
        (2) a generally horizontal cargo-carrying position wherein said panel spans the space between said elevated floor portion and said seat back with said flange portion overlapping the rearward edge of said seat back and said panel back surface lying substantially flush with said elevated floor portion and said back surface of said seat back to form therewith a flat, continuous cargo floor;
    (D) a link pivotally connected
        (1) adjacent its one end to said seat back and
        (2) adjacent its other end to said panel at a location thereon lying, with said panel and said seat occupying their aforesaid cargo-carrying positions, below the plane containing the link-to-seat back and panel-to-body axes, whereby said link-to-panel axis assumes an over center relationship to press said flange portion downwardly against the overlapped portion of said seat back to form a displacement resistant connection therebetween.

2. In a motor vehicle body of the type including a floor having an elevated cargo-carrying portion:
 (A) a vehicle seat comprising
  (1) a seat bottom and
  (2) a seat back having a flat back surface;
 (B) means pivotally mounting said seat back on said body for pivotal movement between
  (1) a generally upright seating position wherein said seat back extends upwardly above said elevated floor portion adjacent thereto and
  (2) a generally horizontal cargo-carrying position wherein said seat back overlies said seat bottom and said flat back surface is substantially flush with said elevated floor portion but spaced horizontally therefrom;
 (C) a generally rectangular floor panel having a flat back surface, and a flange portion extending forwardly from its forward edge to form an extension of said back surface, said panel being pivoted adjacent one end to said body on an axis adjacent said elevated floor portion for movement between
  (1) a generally upright seating position wherein it extends upwardly above said floor portion adjacent said seat back and
  (2) a generally horizontal cargo-carrying position wherein said panel spans the space between said elevated floor portion and said seat back with said flange portion overlapping the rearward edge of said seat back and said panel back surface lying substantially flush with said elevated floor portion and said back surface of said seat back to form therewith a flat, continuous cargo floor;
 (D) a link pivotally connected adjacent its opposite ends to said seat back and to said floor panel at respective locations on said seat back and panel such that as the latter are moved downwardly and approach their cargo-carrying positions, the link-to-panel axis moves downwardly through the plane containing said panel-to-body and link-to-seat back axes whereby, with seat and panel in their cargo-carrying positions, said link-to-panel axis occupies an over center relationship to press said flange portion downwardly against the overlapped portion of said seat back to form a displacement resistant connection therebetween.

3. A seat assembly according to claim 2 wherein said seat bottom and said seat back include cushions of resilient material and the mounting of said seat back relative to said seat bottom is such that as said seat back is moved downwardly toward its cargo-carrying positions said cushions are mutually compressed, whereby with said seat back and panel in their cargo-carrying positions and said link-to-panel axis in its aforesaid over center position, said cushions generate a force continuously pressing said flange portion downwardly against the overlapped surface of said seat back.

4. A seat assembly according to claim 3 wherein said floor panel further includes a flange portion extending laterally from a side edge of the main body portion thereof to form a handle which may be grasped by an operator to move the link to panel connection back over center and allow the seat back and panel to be moved to their upright seating positions.

References Cited

UNITED STATES PATENTS 2,926,951  3/1960  Kopun _____ 296—66
2,949,331  8/1960  Himka _____ 296—66

BENJAMIN HERSH, *Primary Examiner.*

J. H. BRANNEN, *Assistant Examiner.*